Nov. 13, 1928.                    L. C. BAYLES                  1,691,372
                                 PNEUMATIC TOOL
                              Filed March 16, 1927

INVENTOR.
Lewis C. Bayles.
BY Herbert S. Ogden
HIS ATTORNEY

Patented Nov. 13, 1928.

1,691,372

UNITED STATES PATENT OFFICE.

LEWIS C. BAYLES, OF EASTON, PENNSYLVANIA, ASSIGNOR TO INGERSOLL-RAND COMPANY, OF JERSEY CITY, NEW JERSEY, A CORPORATION OF NEW JERSEY.

PNEUMATIC TOOL.

Application filed March 16, 1927. Serial No. 175,781.

This invention relates to pneumatic tools, but more particularly to a pneumatic tool in which the front inlet passage opens into a bore forwardly of the cylinder chamber and communicates with the cylinder chamber through an annular groove in the periphery of a bushing slidable in the said bore.

The objects of the invention are to automatically stop the reciprocations of the hammer piston whenever the resistance to the working implement is released, thus preventing injury to the front end of the cylinder and associated parts whenever the working implement is drawn out of its normal operative position with respect to the cylinder.

Other objects will appear hereinafter.

Figure 1:
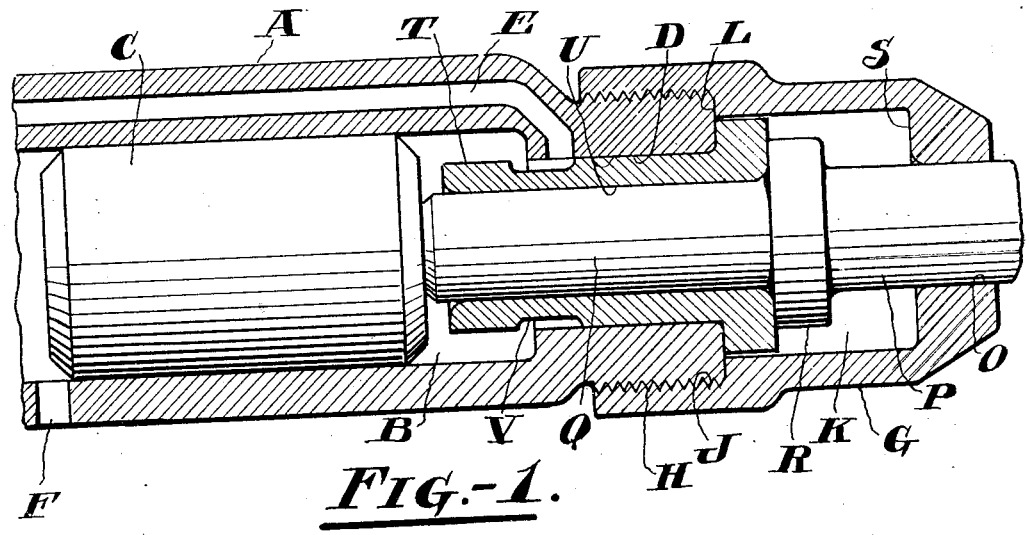
Figure 2:
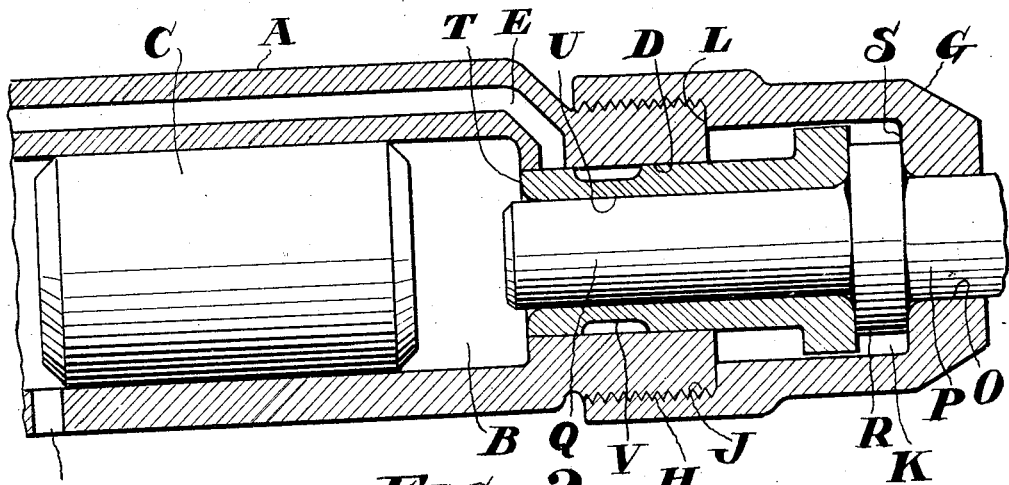
Figure 3:
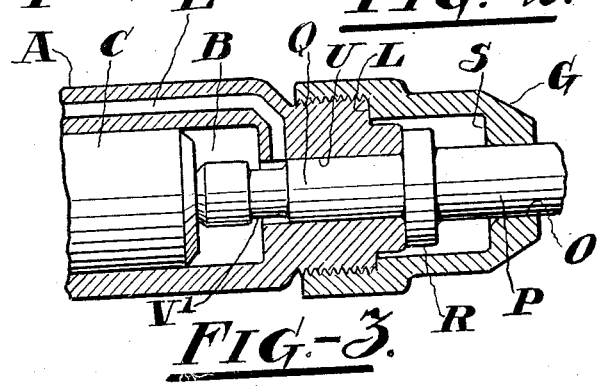

In the drawings illustrating one form which the invention may assume in practice, Figure 1 is a longitudinal sectional view of the front end of a pneumatic tool showing the normal operative position of the bushing, Figure 2 is a view similar to Figure 1 showing the bushing in position to cut off communication between the front inlet passage and the piston chamber, and Figure 3 is a view similar to Figures 1 and 2 showing a modification of the invention.

Referring more particularly to the drawings, A designates a cylinder for a pneumatic tool having a main bore or piston chamber B in which is disposed a reciprocable hammer piston C. In the front end of the cylinder is formed a reduced bore D which may be of smaller diameter than the piston chamber B. Into the rearward end of the bore D opens a front inlet passage E which may lead from a pressure fluid distributing element, such as a valve, (not shown) for supplying pressure fluid to the front end of the piston chamber for impelling the piston C rearwardly. In the present instance the cylinder A is provided with a free exhaust port F controlled by the piston C.

Attached to the end of the cylinder is a front head G, the front end of the cylinder A being threaded as at H to cooperate with a correspondingly threaded recess J in the front head G. Forwardly of the recess J is formed a recess K, preferably of smaller diameter than the threaded recess J. In this way is formed a shoulder L in the front head which may abut the front end of the cylinder A when the front head G is in assembled position on the cylinder.

In the free end of the front head G is formed an aperture O to receive slidably a working implement P which extends with its shank Q into the piston chamber B to receive the blows of the hammer piston C. In order to insure the retention of the working implement P in the front head G, said implement is provided with a collar R which may cooperate with the end wall S of the recess K for limiting longitudinal movement of the working implement P in an outwardly direction.

Means are provided for guiding the working implement P and for holding the shank Q concentrically within the bore D. To that end a bushing T is disposed in the bore D and has a central bore U to receive slidably the shank Q of the working implement P. The bushing T is of sufficiently smaller external diameter than the bore D to enable it to slide freely within the bore. At the front end of the bushing T is formed a lateral flange which may abut the front end of the cylinder A to limit the travel of the bushing in the bore D in the direction of the piston chamber B.

Near the rearward end of the bushing T is formed an external annular groove V which, when the bushing T is in its rearwardmost position, will register with its front end with the inlet passage E and will extend with its rearward end into the piston chamber B, thus providing a free path for pressure fluid from the inlet passage into the front end of the piston chamber. It will be observed that the cross sectional area of the bushing T is considerably smaller than that of the piston chamber B and thus also than that of the hammer piston C. These parts are preferably thus proportioned so that when the pressure fluid enters the front end of the piston chamber B, only a minimum area of the bushing will be exposed to the pressure fluid tending to thrust the bushing T forwardly in the bore D.

During the normal operation of the device, pressure fluid from the inlet passage E will flow through the annular groove V into the front end of the piston chamber B for driving the piston C rearwardly. This relationship of the passages for admitting pressure fluid to the front end of the piston chamber will remain unchanged as long as there is sufficient pressure or resistance to the cutting end of the working implement to maintain the bushing T in retracted position. However, whenever the resistance to the working implement ceases, as for instance, when the material being drilled suddenly parts, the pressure fluid admitted into the front end of the piston chamber B will act against the rearward end of the bushing T, as well as that of the shank Q, and will move the bushing T, together with the working implement forwardly. While a single exposure of the end of the bushing T to the pressure fluid may not be sufficient to completely cut off communication between the front end of the piston chamber B and the inlet passage, successive admissions of pressure fluid to the piston chamber will gradually impel the bushing T forwardly, depending upon the degree of resistance or friction on the working implement, until the annular groove V is moved out of communication with the piston chamber. In this way the supply of pressure fluid to the front end will be cut off and in consequence, the hammer piston C will remain immovable in the piston chamber.

As will be observed, the bushing T may be actuated forwardly by the pressure fluid in the piston chamber until the collar R bears against the end wall S of the front head. If, while the bushing and the working implement are in this position, it be desired to again resume drilling in another location, the working implement may be pressed against the work and such pressure will cause the bushing T to be actuated rearwardly in the bore D to again establish communication between the piston chamber B and the inlet passage E through the annular groove V. In this way the hammer piston C will again be set in motion without requiring the additional operation of manipulating means, such as a throttle valve, ordinarily provided in tools of this type for controlling communication between the tool and a source of pressure fluid supply.

From the foregoing description, it will be evident that after communication between the tool and the source of pressure fluid supply has once been established, it will be unnecessary to further manipulate the controlling means provided for this purpose, since then the action of the hammer piston C may be controlled entirely by pressure to the working implement. The work may be either drilled to completion in which case, when the material separates, resistance to the implement will cease, thus stopping the reciprocations of the hammer piston in the manner described, or the tool may be merely withdrawn from the work whenever it is desired to cease drilling.

The present invention has been found particularly applicable to pneumatic tools, such as coal picks and the like. These picks, as is well known, are frequently used in narrow drifts in which the operator often is compelled to assume positions in which it is difficult to manipulate the various pressure fluid controlling appliances with which tools of this type are usually equipped. The present invention eliminates these difficulties and enables the operator to give his undivided attention to the guiding and supporting of the tool.

Referring now to the modification in Figure 3, the working implement P is guided directly by the bore U. In this instance the shank Q of the working implement is provided with an annular groove V' near its rearward end for controlling the admission of pressure fluid from the inlet passage E into the front end of the piston chamber B. As will be observed, the collar R of the working implement P abuts against the front end of the cylinder A to limit the distance which the shank Q may extend into the piston chamber B.

I claim:

1. In a pneumatic tool, the combination of a cylinder having a reduced bore in its front end, an inlet passage in the cylinder opening into the bore, a hammer piston reciprocable in the cylinder, a working implement extending through the bore to receive the blows of the hammer piston, a slidable bushing in the bore for guiding the working implement, and an annular external groove in the bushing extending into the cylinder to afford communication between the inlet passage and the cylinder in one position of the bushing, said bushing being exposed at one end to pressure fluid in the cylinder whereby it is actuated to another position to cut off communication between the inlet passage and the cylinder upon the cessation of resistance to the working implement, thus preventing reciprocation of the hammer piston.

2. In a pneumatic tool, the combination of a cylinder having a reduced bore in its front end, an inlet passage in the cylinder opening into the bore, a hammer piston reciprocable in the cylinder, a working implement extending through the bore to receive the blows of the hammer piston, a bushing in the bore guiding the working implement, said bushing having an annular external groove near its rearward end, said groove extending into the cylinder in one position of the bushing for admitting pressure fluid from the inlet passage into the cylinder, the rearward end of the bushing being exposed to pressure fluid in the front end of the cylinder whereby said bushing is actuated in a forwardly direction to prevent the admission of pressure fluid into the cylinder upon the cessation of resistance to the working implement, said bushing being normally held in retracted position by resistance to the working implement, a flange on the bushing cooperating with the end of the cylinder for limiting the distance which the bushing may extend into the cylinder, and a front head on the cylinder limiting forward movement of the bushing in the bore.

In testimony whereof I have signed this specification.

LEWIS C. BAYLES.